(12) United States Patent
Randolph

(10) Patent No.: US 8,757,488 B2
(45) Date of Patent: *Jun. 24, 2014

(54) CARD READER PROTECTION SYSTEM

(71) Applicant: Parabit Systems, Inc., Roosevelt, NY (US)

(72) Inventor: Joseph P. Randolph, Winchester, MA (US)

(73) Assignee: Parabit Systems, Inc., Roosevelt, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,158

(22) Filed: Sep. 2, 2013

(65) Prior Publication Data

US 2014/0001262 A1  Jan. 2, 2014

Related U.S. Application Data

(63) Continuation of application No. 13/324,375, filed on Dec. 13, 2011, now Pat. No. 8,523,072.

(51) Int. Cl.
*G06K 7/00* (2006.01)

(52) U.S. Cl.
USPC .......................................... 235/439; 235/380

(58) Field of Classification Search
USPC ................................. 235/435, 439, 380, 379
See application file for complete search history.

(56) References Cited

U.S. PATENT DOCUMENTS

| 6,766,943 | B2 | | 7/2004 | Magee et al. | |
|---|---|---|---|---|---|
| 7,075,429 | B2 | * | 7/2006 | Marshall | 340/540 |
| 7,143,934 | B2 | * | 12/2006 | Ghisani | 235/379 |
| 7,500,609 | B2 | * | 3/2009 | Hirasawa et al. | 235/449 |
| 8,348,162 | B2 | * | 1/2013 | Xiao | 235/435 |
| 8,523,072 | B2 | * | 9/2013 | Randolph | 235/439 |
| 2007/0040023 | A1 | * | 2/2007 | Ruggirello et al. | 235/382 |

* cited by examiner

*Primary Examiner* — Christle I Marshall
(74) *Attorney, Agent, or Firm* — Gerald E. Hespos; Michael J. Porco; Matthew T. Hespos

(57) ABSTRACT

Devices, systems and methods for detecting skimming devices are provided. The present disclosure provides for a card reader assembly including a face plate having a slot for receiving a card in a direction of entry into the slot; an array of infrared proximity detectors disposed on the face plate; and a controller configured to selectively activate the array of infrared proximity detectors to determine if an object, for example, a skimming device, is placed over the slot of the face plate.

21 Claims, 6 Drawing Sheets

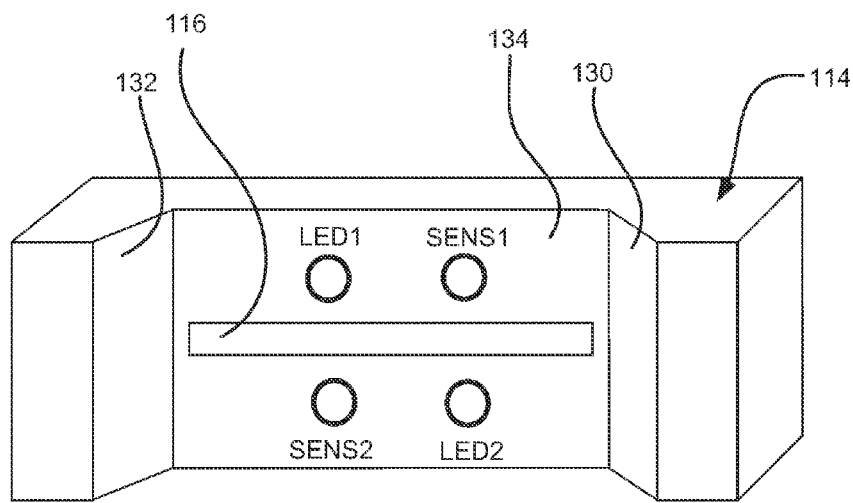
FIG. 4A
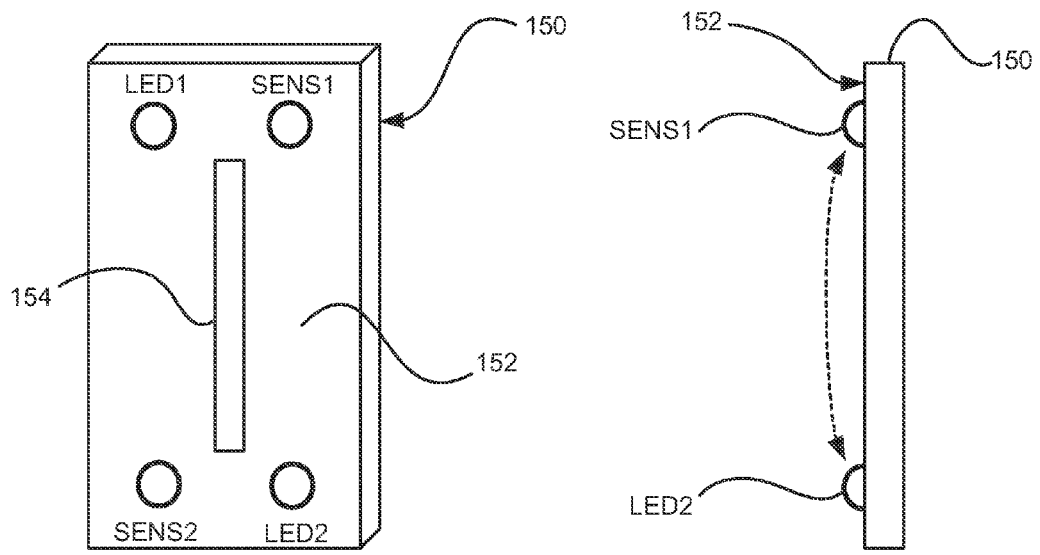
FIG. 4B
FIG. 4C

CARD READER PROTECTION SYSTEM

PRIORITY

The present application is a continuation application of U.S. application Ser. No. 13/324,375, filed Dec. 13, 2011, the contents of which are hereby incorporated by reference in its entirety.

BACKGROUND

1. Field

The present disclosure relates generally to card reader protection systems, and more particularly, to a devices, systems and method for detecting skimming devices.

2. Description of the Related Art

Card readers are data input devices employed to read data from a card-shaped storage medium such as a plastic card with a magnetic stripe. Card readers may be employed, for example, as access control devices and at self-service terminals, for example, automated teller machines (ATMs), gas pumps, parking facilities, etc.

Conventional self-service terminals are frequently encountered functioning as an automated teller machine (ATM) or account statement printer. In order to operate said terminal, the user, or customer, requires a bank card that usually takes the form of a magnetic stripe card, which is read by a card reader, on which card data including personal customer and account data are stored. Unfortunately, manipulation at self-service terminals is being practiced to an increasing degree by third parties in order to illegally acquire these data.

To do this, third parties employ their own card reader, known as a skimming device, which are installed as unobtrusively as possible at the particular self-service terminal's card reader. The skimming device is positioned as directly as possible in front of the authentic card slot for the self-service terminal or replaces the actual card reader. When a customer inserts their bank card into the card reader of the self-service terminal, its magnetic stripe is also read by this illicit external card reader, whereby the third party acquires the card data, in particular the customer's account data, making it possible for the third party to produce an illegal copy of the bank card. If the third party is additionally successful in spying out the PIN associated with the card, they can easily withdraw money from the bank customer's account at automated teller machines (ATMs) using a counterfeit bank card and the PIN. In order to obtain the PIN information, it is possible, for example, to install a counterfeit keypad over the genuine keypad in order to acquire the keystrokes that have been made or to install a micro video camera that captures images of the customer entering a PIN via the original keypad.

Therefore, a need exists for devices, systems and methods for detecting the invasion of skimming devices used in conjunction with a card reader.

SUMMARY

Devices, systems and method for detecting skimming devices are provided.

According to one aspect of the present disclosure, a card reader assembly includes a housing having a slot disposed on a face plate, the slot for receiving a card in a direction of entry into the slot; the face plate including an array of light emitters and sensors configured to detect an object placed over the slot.

In one aspect, the light emitters and sensors are infrared emitters and sensors, although other types of light emitters and sensors may be employed.

In another aspect, the face plate includes a first surface including the slot; and first and second inclined surfaces disposed at a predetermined angle relative to the first surface, each of the first and second inclined surface including at least one emitter and at least one sensor, wherein the first and second inclined surfaces are disposed on opposite ends of the slot to face each other. The predetermined angle is from about 30 degrees to about 60 degrees.

In a further aspect, the card reader includes a controller configured to activate the emitters and measure light with the sensors. In one embodiment, the controller is configured to perform the activation of the emitters and measurements by the sensors sequentially, wherein the sequence is repeated over a predetermined period of time. In other embodiments, the controller is configured to generate an alarm if the object is present for the predetermined period of time.

In yet another aspect, the controller of the card reader assembly is configured to take a plurality of measurements by each sensor, where each of the plurality of measurements being taken at a different sensitivity level to compensate for ambient light.

According to another aspect of the present disclosure, a card reader assembly is provided including a face plate including a slot for receiving a card in a direction of entry into the slot; an array of infrared proximity detectors disposed on the face plate; and a controller configured to selectively activate the array of infrared proximity detectors to determine if an object is placed over the slot of the face plate.

BRIEF DESCRIPTION OF THE DRAWINGS

The above and other aspects, features, and advantages of the present disclosure will become more apparent in light of the following detailed description when taken in conjunction with the accompanying drawings in which:

FIG. 4A is a view of a face plate of the anti-skimming device in accordance with another embodiment of the present disclosure;

FIG. 4B is a view of a face plate of the anti-skimming device in accordance with yet another embodiment of the present disclosure FIG. 4C is a side view of the face plate shown in FIG. 4B;

DETAILED DESCRIPTION

Figure 1:
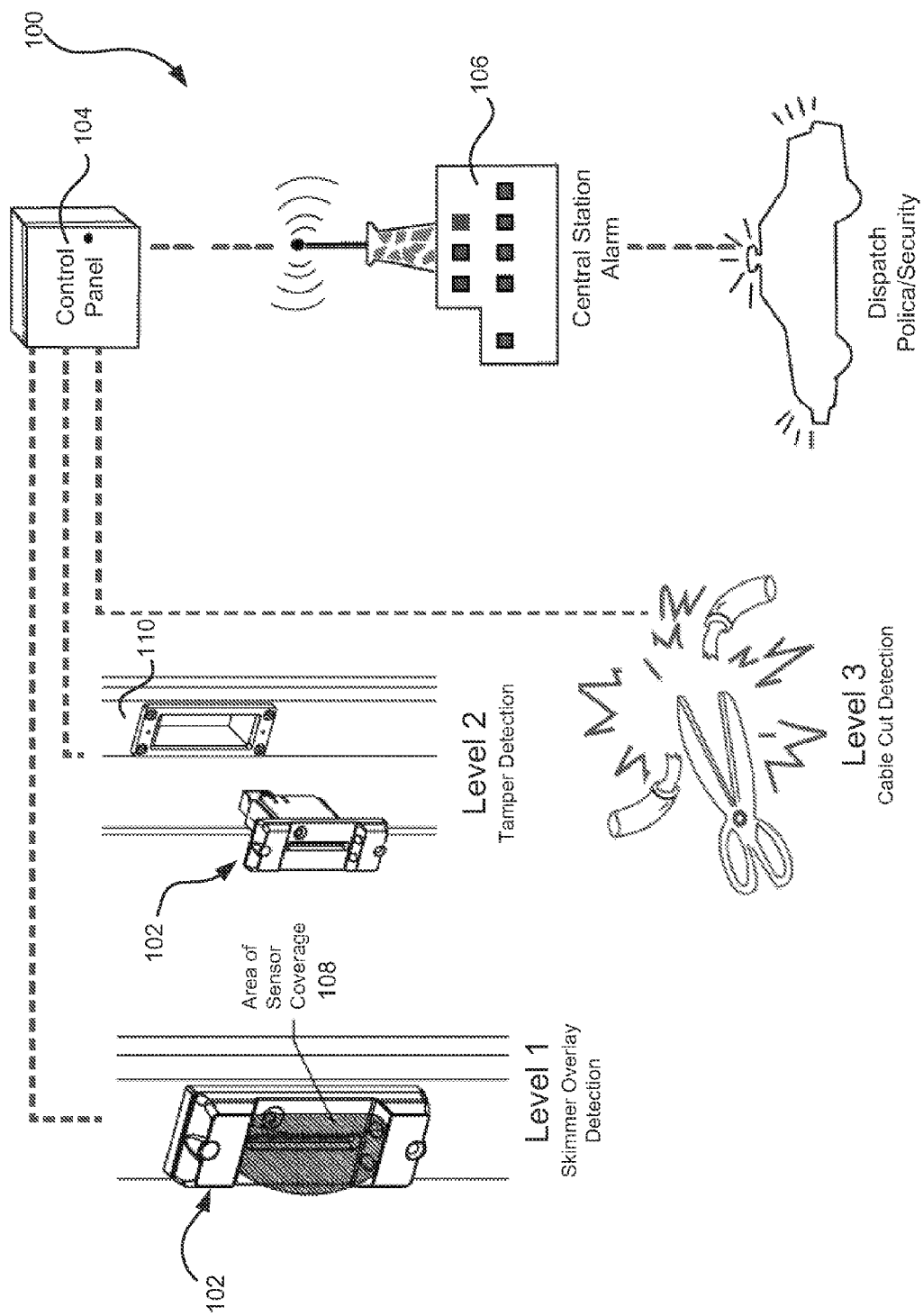
FIG. 1 is a diagram of a card reader protection system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components. Such intermediate components may include both hardware and software based components.

Referring to FIG. 1, a card reader protection system 100 in accordance with an embodiment of the present disclosure is illustrated. The card reader protection system 100 includes a card reader assembly 102 coupled to a control panel 104, which is in communication with an alarm monitoring central station 106. The card reader protection system 100 provides three levels of detection 1.) skimmer overlay detection; 2.) tamper detection; and 3.) cable cut detection. Initially, the card reader assembly 102 is configured to constantly monitor a defined area 108 in front of the card reader surface to detect if a skimming device was placed thereon. A faceplate of the card reader assembly 102 also provides raised sections which provide for a mechanically difficult area to install a skimming device. When an object is placed over a card slot of the card reader assembly 102 for a predetermined time interval, an input will be activated on the control panel 104. Secondly, the card reader assembly 102 provides a tamper detection indication to the control panel 104 immediately upon the removal of the card reader assembly 102 from its installed location 110, for example, a door frame of an access entrance. Thirdly, the card reader protection system 100 constantly monitors continuity of a cable or wires between the card reader assembly 102 and the control panel 104. Once any of the cables or wires between the card reader assembly 102 and the control panel 104 are cut, an input is activated on the control panel 104.

It is to be appreciated that any one of the above described conditions will trigger an alarm at the control panel 104. In one embodiment, an alarm trigger will cause the alarm to be transmitted to, for example, a central station which will notify or dispatch the proper party. In another embodiment, alarm trigger may be employed to activate a video recorder at the site in an attempt to capture an image of a person attempting to manipulate the system. In a further embodiment, an alarm trigger may be employed to disable a corresponding system, e.g., an ATM, an access control system, etc. It is appreciated that these examples are not exhaustive and other example and scenarios are contemplated by the teachings of the present disclosure.

Although the teachings of the present disclosure are described in relation to a card reader assembly employed with an access control system, the card reader assembly may be employed in various systems and apparatus such as an automated teller machine (ATM), a self-service gas pump, a parking system, etc. It is to be appreciated that this list is not exhaustive but merely exemplary environments and the teachings of the present disclosure may be applied to any currently known or to be developed systems that employ mechanisms for reading card-shaped storage mediums, e.g., a bank card. Furthermore, the type of card-shaped storage medium is not critical to the teachings of the present disclosure and may be of various known or to be developed card-shaped storage mediums such as a card with a magnetic stripe or a chip-based card. Additionally, the card-shaped storage medium may take many physical forms, and therefore, its material (e.g., plastic, paper, etc.), thickness, length and width is not critical to the teachings of the present disclosure.

Figure 2:
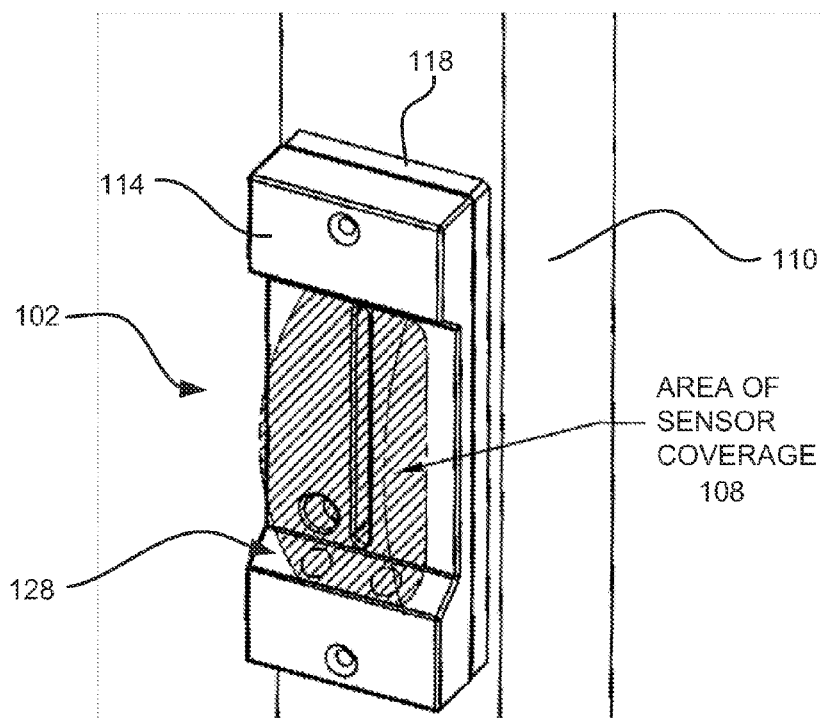
FIG. 2 is a diagram of an anti-skimming device in accordance with an embodiment of the present disclosure.
Figure 3:
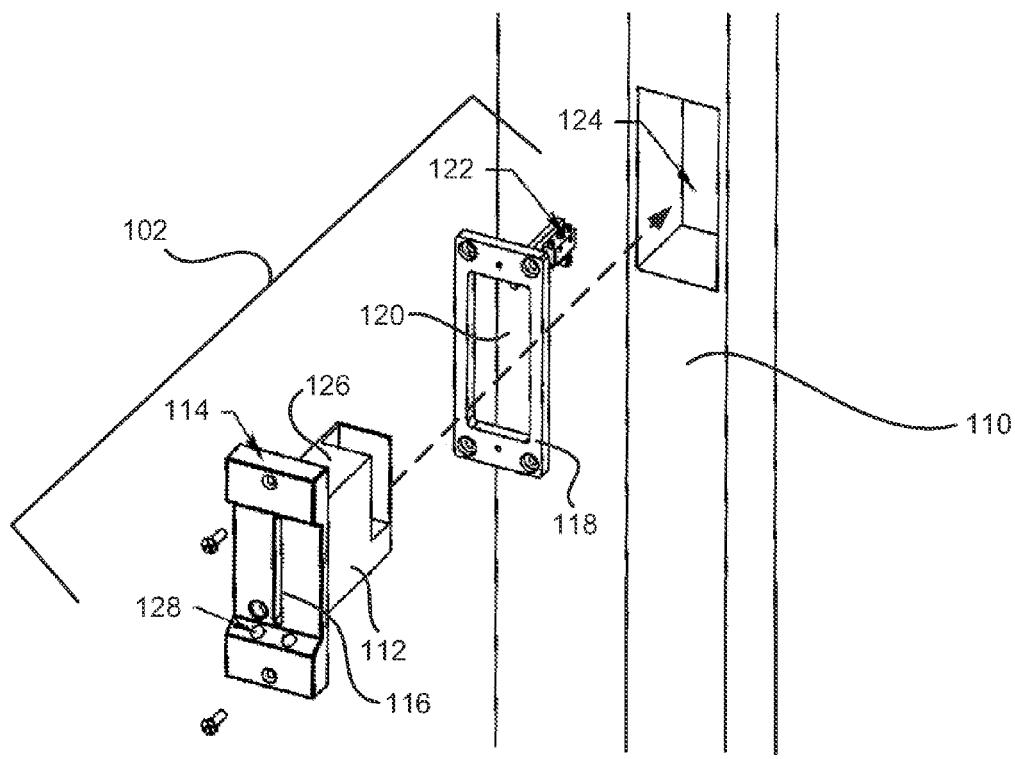
FIG. 3 is an exploded view of the anti-skimming device shown in FIG. 2.

Referring to FIGS. 2 and 3, the card reader assembly 102 is shown in greater detail mounted to a predetermined location 110, e.g., a door frame, and in an exploded view. The card reader assembly 102 includes a housing 112 and a face plate 114 for defining a card slot 116 for receiving a card of a user, e.g., an access card, bank card or the like. The housing 112 is configured to house a card reader or sensor for reading data or information from the card-shaped storage medium, e.g., a magnetic stripe on a plastic or paper bank card. It is to be appreciated that the card reader or sensor will be matched to the type of the card-shaped storage medium employed in a particular embodiment, for example, a card having a magnetic stripe, a chip-based card, etc.

The card reader assembly 102 further includes a collar 118 for securing the housing 112 and face plate 114 to the mounting location 110. The collar 118 is generally rectangular and is configured with an opening 120 to accommodate the housing 112. The collar 118 further includes a contact switch 122 that monitors the removal of the housing 112 when installed at the mounting location 110. Generally, the mounting location 110 includes a cutout 124 to receive at least the housing 112. In the embodiment shown in FIG. 3, the cutout 124 is a generally rectangular aperture on which the collar 118 is mounted. The opening 120 of the collar 118 is configured to coincide with the aperture of the cutout 124. When the collar 118 is mounted on location 110, the contact switch 122 is disposed in the cutout 124 and is configured to make contact with a surface 126 of the housing 112 when the housing 112 is disposed in the cutout 124. Any movement of the housing 112 greater than a predetermined distance, e.g., 1/16th of an inch, activates an input on the control panel 104.

The face plate 114 includes an array of infrared proximity detectors 128, e.g., two sets of infrared emitters and receivers, that constantly monitor an area 108 in front of a surface of the face plate 114. Any object, e.g., a skimming device, placed on the face plate 114, or partially covering the card reader slot 116 will be detected and trigger an alarm to the control panel 104. It is to be appreciated that infrared emitters and receivers are exemplary and other types of light emitters and receivers are contemplated to be within the scope of the present disclosure.

Figure 4:
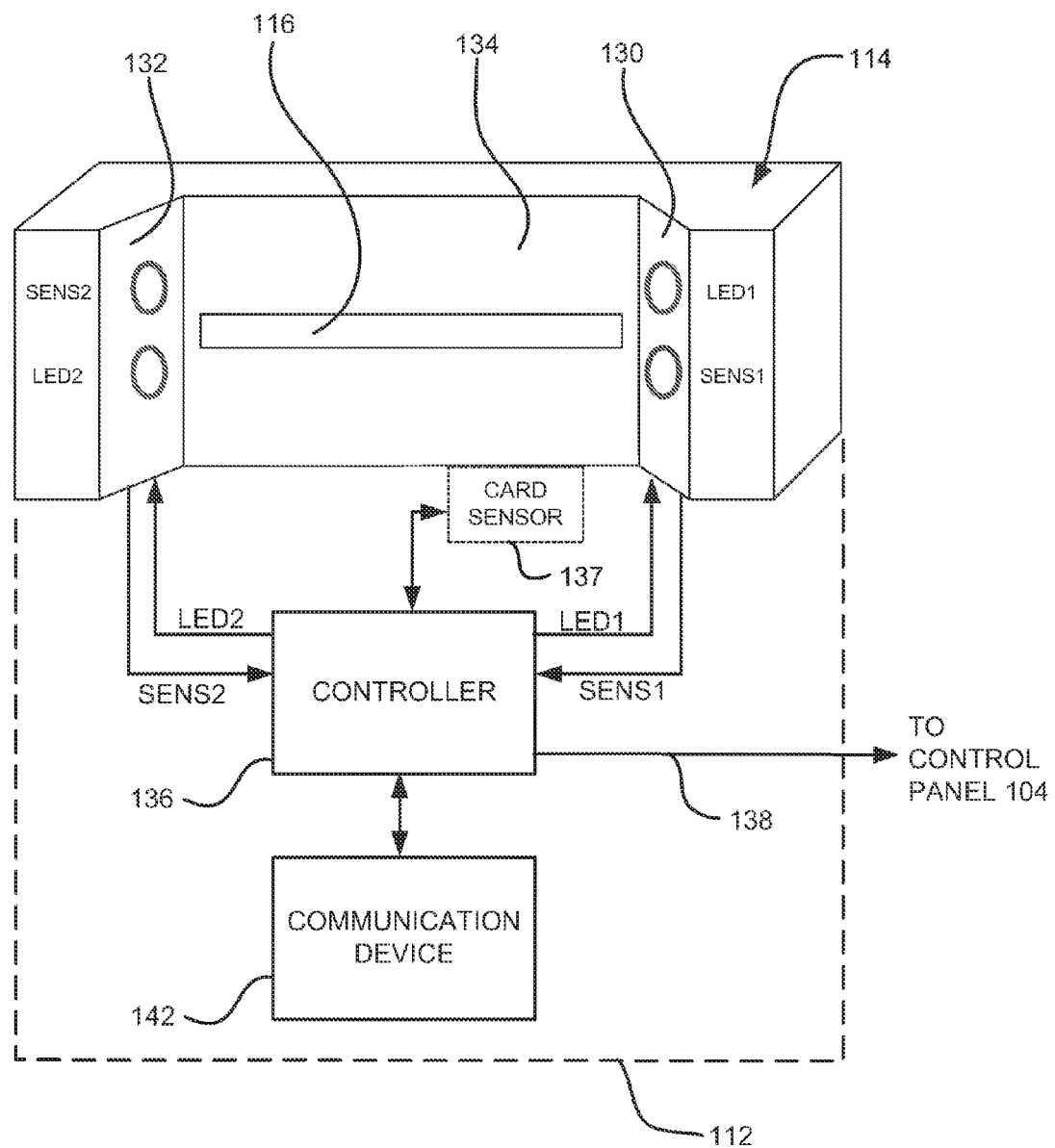
FIG. 4 is a view of a face plate of the anti-skimming device in accordance with an embodiment of the present disclosure.

The skimming device detection feature will be described with reference to FIG. 4. In this embodiment, the face plate 114 of the card reader contains two sensors (SENS1 and SENS2) and two infra-red LED emitters (LED1 and LED2) disposed on opposite sides of the card slot 116, as shown in FIG. 4. The face plate 114 is configured with inclines surfaces 130, 132, with emitter LED1 and sensor SENS1 disposed on surface 130 and emitter LED2 and sensor SENS2 disposed on surface 132. Inclined surfaces 130, 132 are configured at a predetermined angle, e.g., from about 30 degrees to about 60 degrees, relative to a card slot surface 134 to enable the emitters and sensors to communicate to each other and detect objects therebetween. Other angles are also contemplated to be within the scope of the present disclosure. The key aspect of selecting a specific angle is to carefully balance the coupling of the emitters and sensors. For example, emitter LED1 must be sufficiently coupled to sensor SENS2 to enable adequate sensing for measurements across the face of the reader, but sensor SENS1 must normally see very little reflection from emitter LED1 for other measurements, as will be described in more detail below.

In other embodiments, the emitter LED1 and sensor SENS1 will be disposed across from emitter LED2 and sensor SENS2 along the longest length of the slot 116, as shown in FIG. 4A. It is to be appreciated that the emitters and sensors can be positioned anywhere along the face plate as long as the emitters are sufficiently coupled to sensors to enable adequate sensing for measurements across the face of the slot 116 and/or face plate 114. For example, in another embodiment, a face plate 150 is configured as a flat surface without inclined surfaces, as shown in FIGS. 4B and 4C. In this embodiment, the emitters and sensors are disposed on a top surface 152 of the face plate 150 to be exposed enough so that the emitters are sufficiently coupled to the sensors (as shown by the dashed arrow) to enable adequate sensing for measurements across the face of the slot 154 and/or face plate 150.

Activation of the emitters LED1, LED2 and measurement capture by sensors SENS1, SENS2 are controlled by a controller 136 disposed in the housing 112. Four separate measurements (A-D) are made by the controller 136:

A) LED1 emits a pulse of light and SENS1 measures how much light is reflected back. No or low reflection means that no skimming device is present. Low reflection meaning that the light sensed by sensor SENS1 is below a predetermined detection threshold.

B) LED1 emits a pulse of light and SENS2 measures how much light is received. Sufficient light reaching SENS2 means that nothing is blocking the light path, i.e., the light sensed by sensor SENS2 is greater than a predetermined detection threshold.

C) LED2 emits a pulse of light and SENS2 measures how much light is reflected back. No or low reflection means that no skimmer is present. Low reflection meaning that the light sensed by sensor SENS1 is below a predetermined detection threshold.

D) LED2 emits a pulse of light and SENS1 measures how much light is received. Sufficient light reaching SENS1 means that nothing is blocking the light path, i.e., the light sensed by sensor SENS1 is greater than a predetermined detection threshold.

It is to be appreciated that the angle of the inclined surfaces 130, 132 relative to the card slot surface 134 is selected to simultaneously achieve low coupling for measurements A and C, and high coupling for measurements B and D. The detection algorithm then compares the measured values for measurements A, B, C, and D to a stored table of detection thresholds that have been selected through empirical testing. These detection thresholds can be adjusted to make the detection either more sensitive or less sensitive to avoid false-positive or false-negative detection events.

Measurements A and C will typically detect any object that is placed in front of the card slot 116, but these measurements are easily defeated. Simply placing a piece of black tape over the sensors SENS1, SENS2 will eliminate all the reflected light coming back to the sensors, so the detectors will not sense that a skimmer is present.

On the other hand, measurements B and D are actually looking for a certain amount of light to reach the sensor under normal conditions. Placing a skimming device between the two ends of the face plate will block the light transfer across the face of the reader and trigger a detection. This detection can be defeated by building a skimming device that leaves space for light to travel across the face of the reader.

The device, system and method of the present disclosure combines measurements A and C with measurements B and D so that any effort to defeat one method will trigger the other. For example, any effort to defeat measurements A and C by blocking the sensors (such as the black tape method) will trigger measurements B and D. The key aspect of this feature is to use the same emitter for measurements A and B and the same emitter for measurements C and D, and the same sensor for measurements A and D and the same sensor for measurements B and C. It is not possible to block any sensor or emitter and still pass all four tests.

Figure 5:
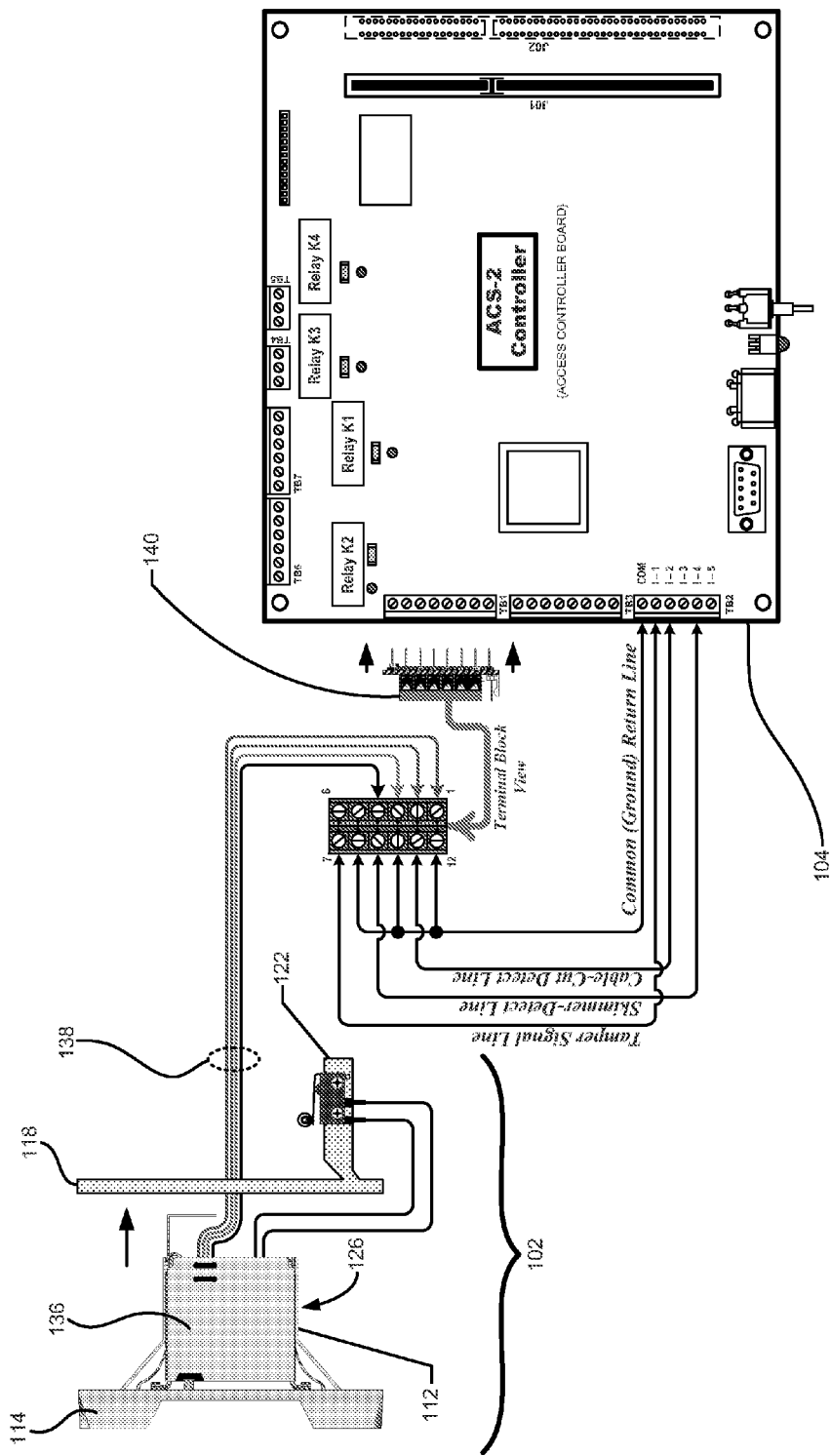
FIG. 5 a schematic diagram of the card reader protection system in accordance with an embodiment of the present disclosure.

The controller 136 activates the emitters LED1, LED2 and sensors SENS1, SENS2 selectively to capture measurements A-D. The controller 136 determines if an object, e.g., a skimming device, has been detected and, upon detection, transmits a signal to the control panel 104 via cable 138, as shown in FIG. 5. In this embodiment, controller 136 is coupled via cable 138 to a second controller 140 located at the control panel 104. The communications between the controller 136 and the second controller 140 is in accordance with the RS-485 protocol and only requires four wires in cable 138, i.e., two for power and two for communications.

It is to be appreciated that the controller 136 also reads data from a magnetic stripe of a card inserted into slot 116 via card reader or sensor 137, shown in dashed lines. In other embodiments, the controller 136 also monitors the status of contact or tamper switch 122. The read card data and tamper status can be multiplexed by the controller 136 over the RS-485 communication link 138 to control panel 104.

It is to be appreciated that other communication methods are contemplated by the present disclosure. For example, the detection determination of controller 136 may be programmed into the control panel 104 eliminating the need for controller 136. In this example, additional wires would be necessary and wired to each emitter and sensor.

In another embodiment, a communication device 142 maybe coupled to the controller 136 and disposed in the housing 112. The communication device 142 may be a modem, network interface card (NIC), wireless transceiver, etc. The communication device 142 may coupled the controller 136 to a personal computer, the control panel 104, a central station, over a network, e.g., a LAN, WAN, the Internet, etc. The communication device 142 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. It is to be appreciated that the network may be a local area network (LAN), wide area network (WAN), the Internet or any known network that couples a plurality of computers to enable various modes of communication via network messages. Furthermore, communication device 142 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Figure 6:
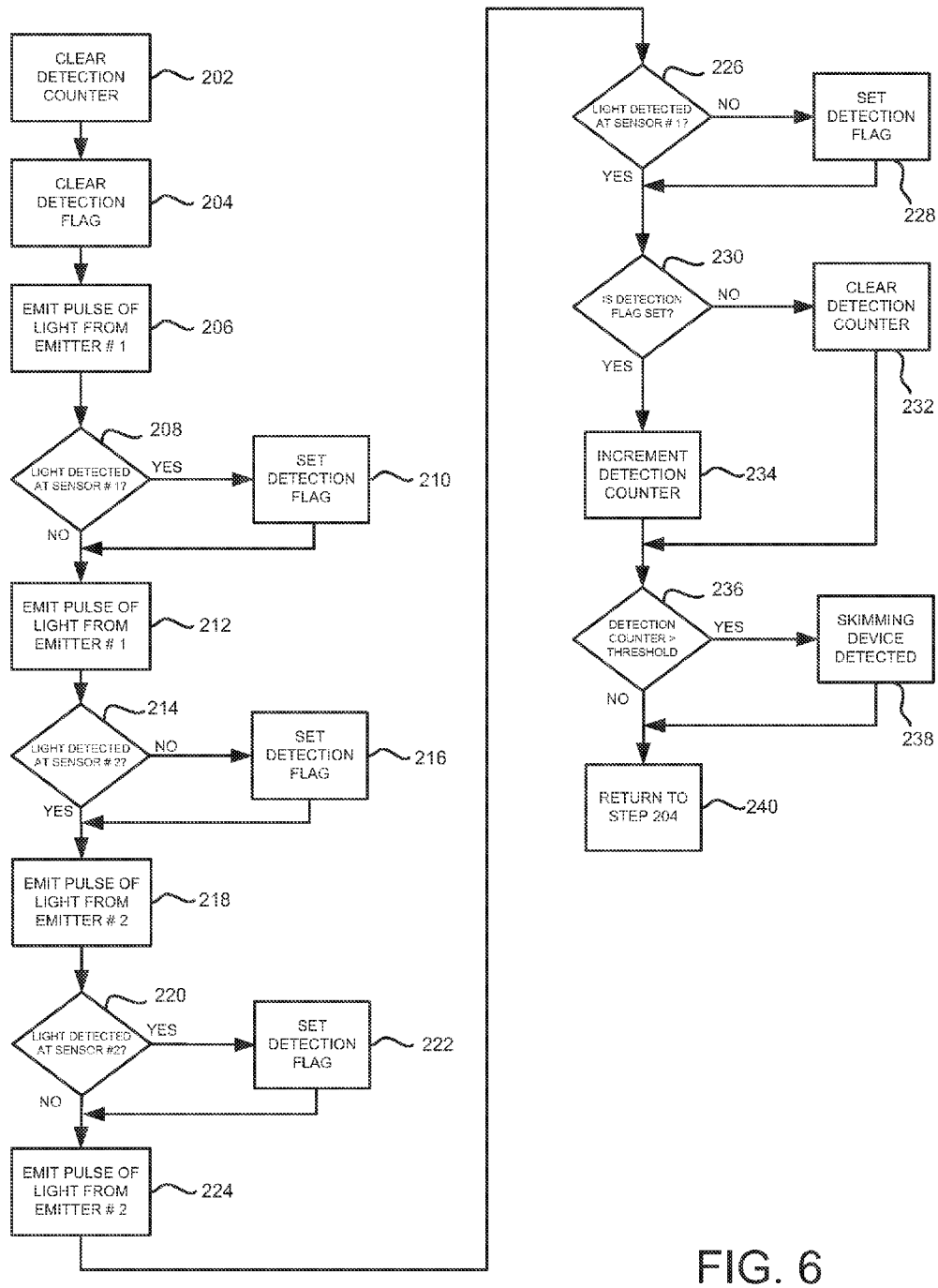
FIG. 6 is a flow chart illustrating a method for detecting a skimming device in accordance with an embodiment of the present disclosure.

Referring to FIG. 6, a method for detecting a skimming device in accordance with an embodiment of the present disclosure is illustrated. Initially, in step 202, a detection counter is initialized or cleared. In step 204, a detection flag is initialized or cleared. Next, a pulse of light is emitted from emitter LED1, step 206. At step 208, it is determined if light is detected at sensor SENS1, i.e., measurement A. If light is detected at sensor SENS1, the detection flag is set, in step 210; otherwise, the method moves to step 212.

In step 212, a pulse of light is emitted from emitter LED1. At step 214, it is determined if light is detected at sensor SENS2, i.e., measurement B. If no light is detected at sensor SENS2, the detection flag is set, in step 216; otherwise, the method moves to step 218.

In step 218, a pulse of light is emitted from emitter LED2. At step 220, it is determined if light is detected at sensor SENS2, i.e., measurement C. If light is detected at sensor SENS2, the detection flag is set, in step 222; otherwise, the method moves to step 224.

In step 224, a pulse of light is emitted from emitter LED2. At step 226, it is determined if light is detected at sensor SENS1, i.e., measurement D. If no light is detected at sensor SENS1, the detection flag is set, in step 228; otherwise, the method moves to step 230.

In step 230, it is determined if the detection flag was set by any of the measurements above, i.e., measurements A, B, C, D. If the detection flag is not set, the detection counter is cleared, in step 232, and the method proceeds to step 236. If it is determined that the detection flag is set in step 230, the detection counter is incremented, step 234. In step 236, it is determined if the detection counter is greater than a predetermined threshold. If the value of the detection counter is less than the predetermined threshold, it is determined that no skimming device is present and the method proceeds to step 240 which loops the method back to step 204. If the value of the detection counter is greater than the predetermined threshold, it is determined that a skimming device has been detected, step 238. After it is determined that the skimming device is detected, the method proceeds to step 240 which loops the method back to step 204 to continuously monitor for a skimming device.

The sequence of the method of FIG. 6 performs all four measurements sequentially, regardless of whether a possible skimmer is detected at any one measurement. The resulting series of steps in the flow chart constitutes a standard "measurement cycle" that is repeated at a periodic interval, e.g., about seven seconds, but the length of this interval is not critical.

Since normal user operation of the card reader assembly 102 will typically trigger detection on one or more measurement cycles, no action is taken unless a large number of successive measurement cycles each show a possible skimming device, i.e., the detection counter is greater than the predetermined threshold at step 236. In one embodiment, the predetermined detection counter threshold will be correlated to a time interval, i.e., the threshold value is selected to be the number of times continuous detection can be determined in a given time period. In one embodiment, the present algorithm looks for 30 minutes of continuous detection, although the 30 minute interval is a configurable parameter. In other words, a skimmer alarm is only declared if every measurement cycle for the last 30 minutes showed a possible skimming device detected on one or more of the four measurements in each measurement cycle.

It is to be appreciated that the predetermined detection counter threshold is selected to screen out the momentary detections that will occur during normal use of the card reader assembly, and trigger an alarm only if there is a sustained detection that would indicate a skimming device has been attached. However, the screening method described above can be done with a variety of algorithms, and the teachings of the present disclosure is not meant to be limited to the specific screening algorithm described above. For example, in another embodiment, the algorithm would look for a "preponderance" of detection events over a given interval, in contrast to continuous detection.

Although the method of FIG. 6 illustrates each measurement, e.g., measurements A, B, C, D, being taken sequentially, other sequences and measurements are contemplated. For example, measurements A and B can be taken simultaneously by sensors SENS1 and SENS2 with emitter LED1 emitting light. Likewise, measurements C and D can be taken simultaneously by sensors SENS1 and SENS2 with emitter LED2 emitting light. It is to be appreciated that in this embodiment, several steps shown in FIG. 6 can be eliminated.

It is to be appreciated that employing infra-red proximity detection, where the amount of light reflected off an object is measured, involves measuring very low levels of light. This is the measurement mode used for measurements A and C, described above. Reflectance-based proximity detection is particularly difficult if the object being detected is black, since very little light reflects off of a black object. Therefore, detecting a black object by measuring the light that reflects off of it requires an exquisitely sensitive sensor. However, normal sunlight contains extraordinary amounts of infra-red light. As a result, normal sunlight will typically overwhelm a sensitive infra-red detector and effectively blind it. On the other hand, if the sensor is configured to be less sensitive so that direct sunlight does not blind it, the resulting sensitivity would be too low to detect black objects, e.g., a black skimming device.

To overcome these shortcomings, the device and method of the present disclosure performs each measurement (namely, measurements A, B, C, D) at six different sensitivity settings. Furthermore, the device and method determines when a particular sensor is being blinded by excessive light and sets a flag to indicate it has become saturated (i.e., blinded). In this manner, the device and method determines when the particular sensor is being blinded and ignores the false readings that resulted from that condition.

In one embodiment, the controller 136 makes each measurement at six different sensitivity settings, and then simply ignores the results of any measurement where the sensor was blinded or saturated. Sensitivity Level 1 is a low sensitivity configuration that operates reasonably well in direct sunlight but can not detect black objects. Sensitivity Level 6 is an extremely sensitive configuration that detects black objects in an environment with low ambient light, but is completely blinded by even modest levels of sunlight. Sensitivity levels 2, 3, 4, and 5 are evenly spaced between these two extremes.

In use, the low sensitivity settings perform well when detecting objects in direct sunlight, while the high sensitivity settings perform well when detecting black objects in low ambient light. For example, in a worst-case scenario where a black skimming device is placed over (but not on) the slot, the skimming device will also block ambient sunlight, however, the more sensitive settings will allow the controller 136 to get a valid measurement.

While the flow chart of FIG. 6 shows only four measurements A, B, C, and D being made, in certain embodiments, each of the four measurements is made at six different sensitivity levels, for a total of 24 separate measurements. Any measurement where the sensor reports saturation (i.e., blinding) is ignored. This approach naturally compensates for the wide variation in ambient light. In essence, whatever measurements can succeed without saturation are used to detect a skimming device, and any measurements that experience saturation are ignored. This method handles the full range of ambient light conditions with the full range of possible skimmers, e.g., skimming device of different colors or material.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A card reader assembly comprising:
a housing having a slot disposed on a face plate, the slot for receiving a card in a direction of entry into the slot; and
an array of at least two light emitters and at least two light sensors configured to detect an object placed over the slot,
wherein a first light sensor is arranged to sense reflected light originating from a first light emitter and to sense light received by a direct path originating from a second light emitter and a second light sensor is arranged to sense reflected light originating from the second light emitter and to sense light received by a direct path originating from the first light emitter.

2. The card reader assembly as in claim 1, wherein the first light emitter and the first light sensor are disposed on one side of the slot and the second light emitter and the second light sensor are disposed on an opposite side of the slot.

3. The card reader assembly as in claim 1, wherein the first light emitter and the first light sensor are disposed on one end of the slot and the second light emitter and the second light sensor are disposed on an opposite end of the slot.

4. The card reader assembly as in claim 1, further comprises a controller configured to activate the at least two light emitters and measure light with the at least two light sensors.

5. The card reader assembly as in claim 4, wherein the controller is configured to activate the first light emitter and determine if light from the first light emitter was measured by the first light sensor, wherein if the light from the first light emitter was measured by the first light sensor as being above a first predetermined threshold, the controller determines that an object is present.

6. The card reader assembly as in claim 5, wherein the controller is configured to activate the first light emitter and determine if light from the first light emitter was measured by the second light sensor, wherein if the light from the first light emitter was measured by the second light sensor as being below a second predetermined threshold, the controller determines that an object is present.

7. The card reader assembly as in claim 6, wherein the controller is configured to activate the second light emitter and determine if light from the second light emitter was measured by the second light sensor, wherein if the light from the second light emitter was measured by the second light sensor as being above a third predetermined threshold, the controller determines that an object is present.

8. The card reader assembly as in claim 7, wherein the controller is configured to activate the second light emitter and determine if light from the second light emitter was measured by the first light sensor, wherein if the light from the second light emitter was measured by the first light sensor as being below a fourth predetermined threshold, the controller determines that an object is present.

9. The card reader assembly as in claim 8, wherein the first light emitter and the first light sensor are disposed on one side of the slot and the second light emitter and the second light sensor are disposed on an opposite side of the slot.

10. The card reader assembly as in claim 8, wherein the first light emitter and the first light sensor are disposed on one end of the slot and the second light emitter and the second light sensor are disposed on an opposite end of the slot.

11. The card reader assembly as in claim 8, wherein the controller is further configured to perform the activation of the at least two light emitters and measurements by the at least two sensors sequentially, wherein the sequence is repeated over a predetermined period of time.

12. The card reader assembly as in claim 11, wherein the controller is further configured to take a plurality of measurements by each of the at least two light sensors, each of the plurality of measurements being taken at a different sensitivity level of the at least two light sensors.

13. The card reader assembly as in claim 11, wherein the controller is further configured to generate a signal if the object is present for the predetermined period of time.

14. The card reader assembly as in claim 12, further comprising a communication device coupled to the controller for transmitting the signal to another device.

15. The card reader assembly as in claim 14, wherein the communication device is a wireless communication device.

16. A card reader assembly comprising:
a housing having a slot disposed on a face plate, the slot for receiving a card in a direction of entry into the slot; and
an array of at least two light emitters and at least two light sensors configured to detect an object placed over the slot,
wherein a first light sensor is arranged to sense reflected light originating from a first light emitter and to sense light received by a direct path originating from a second light emitter and at least one second light sensor is arranged to sense reflected light originating from at least one third light emitter and to sense light received by a direct path originating from at least one fourth light emitter.

17. A card reader assembly comprising:
a face plate including a slot for receiving a card in a direction of entry into the slot;
an array of at least two light emitters and at least two light sensors disposed about the slot; and
a controller configured to selectively activate the array of the at least two light emitters and the at least two light sensors to determine if an object is placed over the slot of the face plate, wherein the controller determines if an object is placed over the slot based on sensing reflected light and sensing light received by a direct path.

18. The card reader assembly as in claim 17, wherein a first light emitter and a first light sensor are disposed on one side of the slot and a second light emitter and a second light sensor are disposed on an opposite side of the slot.

19. The card reader assembly as in claim 17, wherein a first light emitter and a first light sensor are disposed on one end of the slot and a second light emitter and a second light sensor are disposed on an opposite end of the slot.

20. The card reader assembly as in claim 17, wherein the controller is further configured to take a plurality of measurements by each of the at least two light sensors, each of the plurality of measurements being taken at a different sensitivity level of the at least two light sensors to compensate for ambient light.

21. The card reader assembly as in claim 17, wherein the controller is further configured to generate a signal if the object is placed over the slot for a predetermined period of time.

* * * * *